US008660687B2

(12) United States Patent
Leng

(10) Patent No.: US 8,660,687 B2
(45) Date of Patent: Feb. 25, 2014

(54) MEDICATION BIN HAVING AN ELECTRONIC DISPLAY AND AN ASSOCIATED METHOD AND COMPUTER PROGRAM PRODUCT

(75) Inventor: Mark Leng, Venetia, PA (US)

(73) Assignee: McKesson Automation Inc., Cranberry, PA (US)

( * ) Notice: Subject to any disclaimer, the term of this patent is extended or adjusted under 35 U.S.C. 154(b) by 851 days.

(21) Appl. No.: 12/750,051

(22) Filed: Mar. 30, 2010

(65) Prior Publication Data

US 2011/0245963 A1 Oct. 6, 2011

(51) Int. Cl.
*G06F 7/00* (2006.01)
*G06F 17/00* (2006.01)

(52) U.S. Cl.
USPC ........... 700/226; 700/216; 700/227; 700/233; 700/213; 700/214; 700/215; 700/228

(58) Field of Classification Search
None
See application file for complete search history.

(56) References Cited

U.S. PATENT DOCUMENTS

| | | | |
|---|---|---|---|
| 4,717,042 | A | 1/1988 | McLaughlin |
| 4,785,969 | A | 11/1988 | McLaughlin |
| 4,847,764 | A | 7/1989 | Halvorson |
| 5,014,875 | A | 5/1991 | McLaughlin et al. |
| 5,190,185 | A | 3/1993 | Blechl |
| 5,314,243 | A | 5/1994 | McDonald et al. |
| 5,346,297 | A | 9/1994 | Colson, Jr. et al. |
| 5,377,864 | A | 1/1995 | Blechl et al. |
| 5,405,048 | A | 4/1995 | Rogers et al. |
| 5,431,299 | A | 7/1995 | Brewer et al. |
| 5,460,294 | A | 10/1995 | Williams |
| 5,468,110 | A | 11/1995 | McDonald et al. |
| 5,480,062 | A | 1/1996 | Rogers et al. |
| 5,520,450 | A | 5/1996 | Colson, Jr. et al. |
| 5,564,803 | A | 10/1996 | McDonald et al. |
| 5,593,267 | A | 1/1997 | McDonald et al. |
| 5,661,978 | A | 9/1997 | Holmes et al. |
| D384,578 | S | 10/1997 | Wangu et al. |
| 5,713,485 | A | 2/1998 | Liff et al. |
| 5,716,114 | A | 2/1998 | Holmes et al. |
| 5,745,366 | A | 4/1998 | Higham et al. |
| 5,761,877 | A | 6/1998 | Quandt |
| 5,797,515 | A | 8/1998 | Liff et al. |
| 5,805,456 | A | 9/1998 | Higham et al. |
| 5,842,976 | A | 12/1998 | Williamson |
| 5,878,885 | A | 3/1999 | Wangu et al. |
| 5,880,443 | A | 3/1999 | McDonald et al. |

(Continued)

OTHER PUBLICATIONS

"*Electronic paper*;" Wikipedia; pp. 1-10; retrieved on Mar. 9, 2010 from <http://en.wikipedia,org/wiki/Electronic_Ink>.

(Continued)

*Primary Examiner* — Yolanda Cumbess
(74) *Attorney, Agent, or Firm* — Alston & Bird LLP

(57) ABSTRACT

A medication bin is provided that includes a bin housing configured to carry medication and other medical supplies, an electronic display, such as a liquid crystal display or electronic paper, carried by the bin housing and a processor carried by the bin housing and configured to control the electronic display. The processor is configured to receive information relating to a destination of the medication or other medical supplies to be carried by the medication bin. The processor is also configured to direct the electronic display to present a representation of the destination. Corresponding methods and computer program products are also provided.

19 Claims, 4 Drawing Sheets

(56) References Cited

U.S. PATENT DOCUMENTS

| | | | |
|---|---|---|---|
| 5,883,806 | A | 3/1999 | Meador et al. |
| 5,893,697 | A | 4/1999 | Zini et al. |
| 5,905,653 | A | 5/1999 | Higham et al. |
| 5,912,818 | A | 6/1999 | McGrady et al. |
| 5,927,540 | A | 7/1999 | Godlewski |
| 5,940,306 | A | 8/1999 | Gardner et al. |
| 5,971,593 | A | 10/1999 | McGrady |
| 6,003,006 | A | 12/1999 | Colella et al. |
| 6,011,999 | A | 1/2000 | Holmes |
| 6,021,392 | A | 2/2000 | Lester et al. |
| 6,039,467 | A | 3/2000 | Holmes |
| 6,065,819 | A | 5/2000 | Holmes et al. |
| 6,068,156 | A | 5/2000 | Liff et al. |
| 6,109,774 | A | 8/2000 | Holmes et al. |
| 6,112,502 | A | 9/2000 | Frederick et al. |
| 6,116,461 | A | 9/2000 | Broadfield et al. |
| 6,151,536 | A | 11/2000 | Arnold et al. |
| 6,170,230 | B1 | 1/2001 | Chudy et al. |
| 6,176,392 | B1 | 1/2001 | William et al. |
| 6,189,727 | B1 | 2/2001 | Shoenfeld |
| 6,223,934 | B1 | 5/2001 | Shoenfeld |
| 6,256,967 | B1 | 7/2001 | Hebron et al. |
| 6,283,322 | B1 | 9/2001 | Liff et al. |
| 6,289,656 | B1 | 9/2001 | Wangu et al. |
| 6,338,007 | B1 | 1/2002 | Broadfield et al. |
| 6,339,732 | B1 | 1/2002 | Phoon et al. |
| 6,361,263 | B1 | 3/2002 | Dewey et al. |
| 6,370,841 | B1 | 4/2002 | Chudy et al. |
| 6,449,927 | B2 | 9/2002 | Hebron et al. |
| 6,471,089 | B2 | 10/2002 | Liff et al. |
| 6,497,342 | B2 | 12/2002 | Zhang et al. |
| 6,499,270 | B2 | 12/2002 | Peroni et al. |
| 6,532,399 | B2 | 3/2003 | Mase |
| 6,564,121 | B1 | 5/2003 | Wallace et al. |
| 6,581,798 | B2 | 6/2003 | Liff et al. |
| 6,609,047 | B1 | 8/2003 | Lipps |
| 6,611,733 | B1 | 8/2003 | De La Huerga |
| 6,625,952 | B1 | 9/2003 | Chudy et al. |
| 6,640,159 | B2 | 10/2003 | Holmes et al. |
| 6,650,964 | B2 | 11/2003 | Spano, Jr. et al. |
| 6,671,579 | B2 | 12/2003 | Spano, Jr. et al. |
| 6,681,149 | B2 | 1/2004 | William et al. |
| 6,742,671 | B2 | 6/2004 | Hebron et al. |
| 6,755,931 | B2 | 6/2004 | Vollm et al. |
| 6,760,643 | B2 | 7/2004 | Lipps |
| 6,776,304 | B2 | 8/2004 | Liff et al. |
| 6,785,589 | B2 | 8/2004 | Eggenberger et al. |
| 6,790,198 | B1 | 9/2004 | White et al. |
| 6,814,254 | B2 | 11/2004 | Liff et al. |
| 6,814,255 | B2 | 11/2004 | Liff et al. |
| 6,847,861 | B2 | 1/2005 | Lunak et al. |
| 6,874,684 | B1 | 4/2005 | Denenberg et al. |
| 6,892,780 | B2 | 5/2005 | Vollm et al. |
| 6,895,304 | B2 | 5/2005 | Spano, Jr. et al. |
| 6,975,922 | B2 | 12/2005 | Duncan et al. |
| 6,985,797 | B2 | 1/2006 | Spano, Jr. et al. |
| 6,996,455 | B2 | 2/2006 | Eggenberger et al. |
| 7,010,389 | B2 | 3/2006 | Lunak et al. |
| 7,014,063 | B2 | 3/2006 | Shows et al. |
| 7,016,766 | B2 | 3/2006 | William et al. |
| 7,040,504 | B2 | 5/2006 | Broadfield et al. |
| 7,052,097 | B2 | 5/2006 | Meek, Jr. et al. |
| 7,072,737 | B2 | 7/2006 | Lunak et al. |
| 7,072,855 | B1 | 7/2006 | Godlewski et al. |
| 7,077,286 | B2 | 7/2006 | Shows et al. |
| 7,085,621 | B2 | 8/2006 | Spano, Jr. et al. |
| 7,092,796 | B2 | 8/2006 | Vanderveen |
| 7,093,755 | B2 | 8/2006 | Jordan et al. |
| 7,100,792 | B2 | 9/2006 | Hunter et al. |
| 7,103,419 | B2 | 9/2006 | Engleson et al. |
| 7,111,780 | B2 | 9/2006 | Broussard et al. |
| 7,139,639 | B2 | 11/2006 | Broussard et al. |
| 7,150,724 | B2 | 12/2006 | Morris et al. |
| 7,171,277 | B2 | 1/2007 | Engleson et al. |
| 7,218,231 | B2 | 5/2007 | Higham |
| 7,228,198 | B2 | 6/2007 | Vollm et al. |
| 7,249,688 | B2 | 7/2007 | Hunter et al. |
| 7,348,884 | B2 | 3/2008 | Higham |
| 7,417,729 | B2 | 8/2008 | Greenwald |
| 7,419,133 | B2 | 9/2008 | Clarke et al. |
| 7,426,425 | B2 | 9/2008 | Meek, Jr. et al. |
| 7,554,449 | B2 | 6/2009 | Higham |
| 7,571,024 | B2 | 8/2009 | Duncan et al. |
| 7,588,167 | B2 | 9/2009 | Hunter et al. |
| 2006/0206235 | A1* | 9/2006 | Shakes et al. ................. 700/216 |
| 2008/0109510 | A1* | 5/2008 | Gerlt et al. .................... 709/201 |
| 2008/0169346 | A1* | 7/2008 | Schad et al. .................. 235/439 |
| 2009/0108016 | A1* | 4/2009 | Brown et al. ................... 221/28 |
| 2013/0110282 | A1* | 5/2013 | Omura .......................... 700/233 |

OTHER PUBLICATIONS

Office Action for Canadian Application No. 2,735,338; dated Aug. 23, 2012.

Office Action for Canadian Application No. 2,735,338; dated Aug. 9, 2013.

* cited by examiner

MEDICATION BIN HAVING AN ELECTRONIC DISPLAY AND AN ASSOCIATED METHOD AND COMPUTER PROGRAM PRODUCT

FIELD OF THE INVENTION

Embodiments of the present invention relate generally to a medication bin and, more particularly, to a medication bin having an electronic display as well as associated methods and computer program products for identifying a destination of a medication bin.

BACKGROUND OF THE INVENTION

In a number of medical facilities, medication and other medical supplies are distributed from one or more locations, such as from a central pharmacy, to a number of patients, to one or more medication cabinets or the like that are dispersed throughout the medical facility. In order to facilitate the distribution of medication and other medical supplies throughout a medical facility, medication bins may be provided. Each medication bin may be filled with the medication or other medical supplies that are to be provided to a particular patient and/or to be stored in a particular medication cabinet. For example, a medication bin may be filled with the medication and other medical supplies to be consumed by a particular patient during one day. Once a medication bin has been filled, the medication bin may be transported to its destination, such as to a healthcare worker responsible for the particular patient or responsible for the filling and maintenance of the medication cabinet. For example, the medication bin may be transported to the nursing station that oversees and has responsibility for the particular patient or the medication cabinet that is the destination of the medication bin. The medication or other medical supplies may then be removed from the medication bin and the medication bin may be returned to the central pharmacy or the like for subsequent use in conjunction with the delivery of other medications or medical supplies.

In order to insure that the medication and other medical supplies are properly distributed throughout the medical facility, it is of importance that the medication bin be delivered to the intended destination. As such, labels are generally printed or handwritten with the destination of the respective medication bins, such as with the name of the patient and the patient's location, such as the unit, floor and/or room number of the patient, or the designation of a particular medication cabinet and its location, such as its unit and/or floor. The labels may then be secured to respective medication bins in order to provide a visible reminder of the destination of the medication bins. Although the labels may be carried by the medication bins in various manners, at least some medication bins include a transparent plastic sleeve in which the labels are inserted and remain during the delivery process. Following delivery of a medication bin to its destination or upon the return of the medication bin to the central pharmacy following its delivery, the label may be removed. Another label may then be printed and associated with the medication bin, such as by being inserted in a plastic sleeve carried by the medication bin, in order to identify the next destination of the medication bin.

The repeated printing of the label and the affixation and removal of the label from the medication bins may consume more time and cost more money than is desired. As such, it would be desirable to provide an improved technique for identifying the destination of medication bins that are repeatedly utilized to transport medication and other medical supplies to various destinations, such as patients and/or medication cabinets distributed throughout a medical facility.

BRIEF SUMMARY OF THE INVENTION

A medication bin is provided in accordance with embodiments of the present invention that provides an improved technique for identifying the destination of the medication bin. In this regard, the medication bin of embodiments of the present invention may display the destination of the medication bin in such a manner that the destination may be readily updated as the medication bin is reused for the distribution of medication and other medical supplies to various patients, medication cabinets or the like. In addition, a method and an associated computer program product are provided according to other embodiments of the present invention for identifying the destination of a medication bin in an efficient and cost effective manner.

A medication bin is provided in accordance with one embodiment that includes a bin housing configured to carry medication and other medical supplies, an electronic display, such as a liquid crystal display or electronic paper, carried by the bin housing and a processor carried by the bin housing and configured to control the electronic display. In this regard, the processor is configured to receive information relating to a destination of the medication or other medical supplies to be carried by the medication bin. The processor is also configured to direct the electronic display to present a representation of the destination.

The medication bin may include an antenna and a receiver communicably connected to the antenna and configured to receive the information relating to the destination and to provide the information to the processor. The processor of one embodiment may be configured to determine if the information relating to the destination was received without error. The processor may also be configured to read the representation of the destination that is presented by the electronic display and to determine if the representation of the destination as presented by the electronic display is accurate. The medication bin of one embodiment may also include an antenna and a transmitter communicably connected to the antenna and configured to transmit a signal indicative of any error relating to receipt and presentation of the information relating to the destination. The bin housing may include indicia, such as a bar code, uniquely identifying the medication bin.

In accordance with another embodiment, a method for identifying the destination of a medication bin is provided. The method provides a bin housing configured to carry medication or other medical supplies. The method also receives information relating to the destination of the medication or other medical supplies to be carried by the medication bin. Further, the method directs an electronic display carried by the bin housing to present a representation of the destination. In one embodiment, following delivery of the medication bin to the destination, the method may receive information relating to another destination for medication or other medical supplies and may then direct the electronic display to change and to present a representation of the another destination. The bin housing may then be refilled with the medication or other medical supplies for the another destination.

The information that is received relating to the destination may be received wirelessly. The method of one embodiment may determine if the information relating to the destination was received without error. Further, the method may read the representation of the destination as presented by the electronic display and determine if the representation of the destination as presented by the electronic display is accurate.

Further, the method of one embodiment may transmit a signal indicative of any error relating to receipt and presentation of the information relating to the destination.

In a further embodiment, a computer program product for identifying a destination of the medication bin that is to carry medication or other medical supplies is provided. The computer program product includes at least one computer-readable storage medium having computer-executable program instructions stored therein. The computer-executable program instructions include program instructions configured to receive information relating to a destination of the medication or other medical supplies to be carried by the medication bin. The computer-executable program instructions may also include program instructions configured to direct an electronic display of the medication bin to present a representation of the destination. In one embodiment, the computer-executable program instructions may also include program instructions configured to receive information relating to another destination for medication or other medical supplies with which the medication bin is refilled following delivery of the medication bin to the destination. The computer-executable program instructions of this embodiment may also include program instructions configured to direct the electronic display to change and to present a representation of the another destination.

The computer-executable program instructions of one embodiment also include program instructions configured to determine if the information relating to the destination was received without error. The computer-executable program instructions of another embodiment may include program instructions configured to read the representation of the destination that is presented by the electronic display and to determine if the representation of the destination as presented by the electronic display is accurate. Further, the computer-executable program instructions of one embodiment may include program instructions configured to cause a signal to be transmitted that is indicative of any error relating to receipt and presentation of the information relating to the destination.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
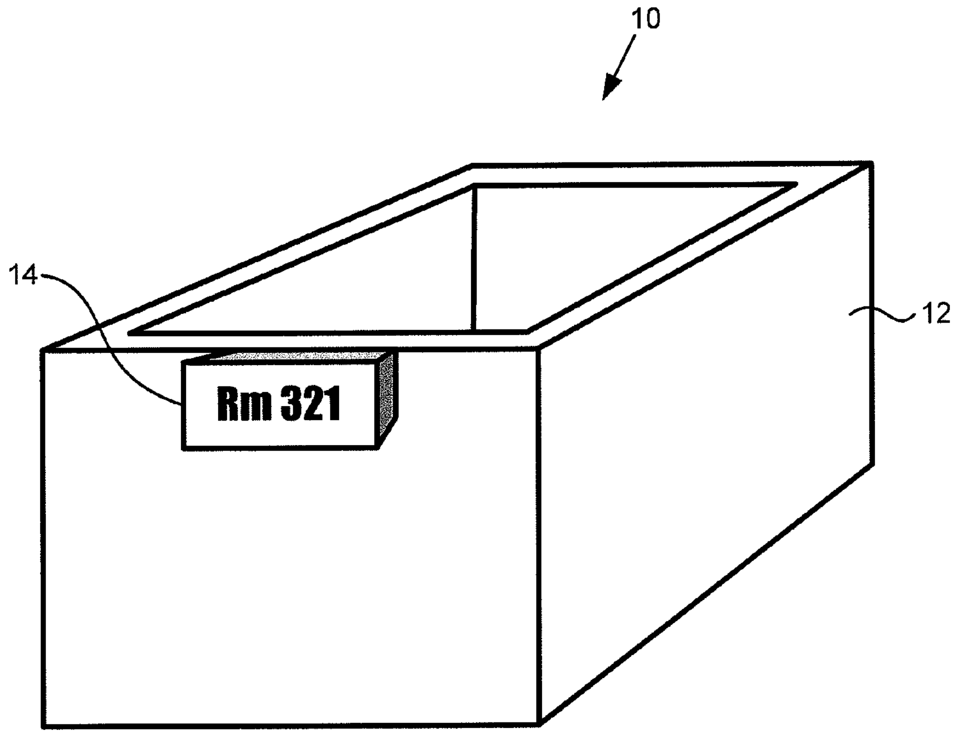
FIG. 1 is a perspective view of a medication bin in accordance with one embodiment of the present invention.

Referring now to FIG. 1, a medication bin 10 in accordance with embodiments of the present invention is depicted. Medication bins may be filled with medication or other medical supplies to be transported, such as from a central pharmacy, a central fill or other common distribution point, to a patient, a medication cabinet or the like located at various places throughout a medical facility, such as in different units of a hospital, different floors of a hospital, different rooms of a hospital or the like. For example, a medication bin may be filled with the medication and other medical supplies that have been prescribed to a respective patient for consumption or use during a particular day. Once the medication bin has been transported to its intended destination, a healthcare provider, such as a nurse, a technician or the like, may remove the medication and other medical supplies from the medication bin and may temporarily store the medication and other medical supplies in a medication cabinet, pending administration to the patient. Once the medication and other medical supplies have been removed from the medication bin, the medication bin may be returned, such as to a central pharmacy, central fill or the like. The medication bin may then be reused, such as to transport other medications and medical supplies to another patient or medication cabinet.

The medication bin 10 includes a bin housing 12 configured to carry the medication or other medical supplies. In the illustrated embodiment, the bin housing has a generally rectangular shape that defines a cavity therewithin for receiving the medication or other medical supplies. However, the bin housing may be differently sized and shaped in other embodiments. In accordance with embodiments of the present invention, the medication bin includes an electronic display 14 carried by the bin housing. In the illustrated embodiment, the electronic display is carried by and mounted to an external surface of a front face of the medication bin. However, the electronic display may be carried by different portions of the medication bin in other embodiments if so desired. In order to facilitate ready recognition of the destination of the medication bin, however, the electronic display of one advantageous embodiment is carried by the electronic bin such that the electronic display is visible even after the medication and other medical supplies have been loaded within the bin housing. The electronic display may be configured in various manners. For example, the electronic display may be a liquid crystal display. Alternatively, the electronic display may be comprised of electronic paper, thereby comprising an electronic ink display.

Figure 2:
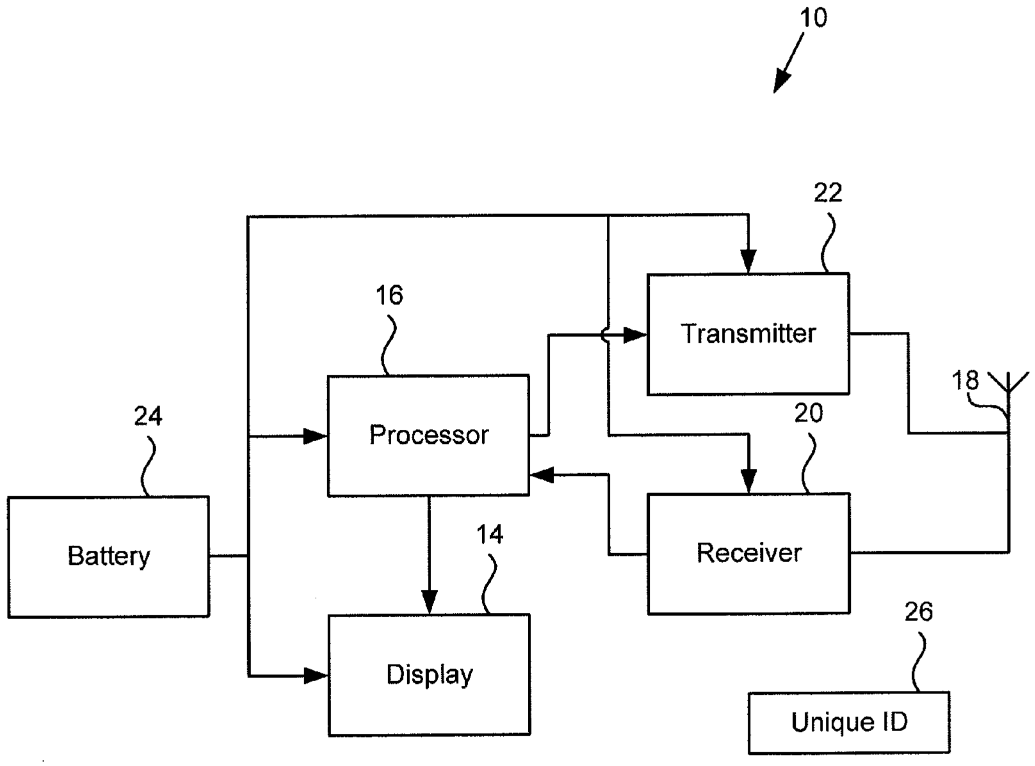
FIG. 2 is a block diagram of at least a portion of a medication bin in accordance with one embodiment of the present invention.

The medication bin 10 of one embodiment also includes a processor 16. Although the processor is carried by the bin housing, the processor is not individually depicted in conjunction with the medication bin of FIG. 1, but is, instead, illustrated in FIG. 2. The processor may be embodied as various processing means such as a processing element, a coprocessor, a controller or various other processing circuitry including integrated circuits such as, for example, an ASIC (application specific integrated circuit), an FPGA (field programmable gate array), a PLC (programmable logic controller), a hardware accelerator, or the like. The processor may be configured (e.g., via hardcoded instructions or via execution of software instructions) to perform or control the various functions described herein. In this regard, the medication bin may also include a memory device, such as volatile and/or non-volatile memory, for storing content, data or the like. For example, the memory device may be non-transitory memory capable of storing content transmitted from, and/or received by, the processor. Also for example, the memory device may store software applications, instructions or the like for enabling the processor to perform its various functions in accordance with embodiments of the present invention.

In accordance with embodiments of the present invention, the processor 16 is configured to control the electronic display 14 and, as such, is in communication with the electronic display. As described below, the processor is configured to receive information relating to the destination of the medication or other medical supplies to be carried by the medication bin 10 and to direct the electronic display to present a representation of the destination. In this regard, the processor may direct the electronic display to present various representations of the destination, such as the name of the patient, the room number of the patient, the name or location of a medication cabinet or the like. Additionally, the processor may be configured to cause the electronic display to alternately present several different representations of the destination, such as by alternately displaying the name of the patient and the room number in which the patient is located.

The medication bin 10 and, in particular, the processor 16 may be configured to communicate with an external delivery system 30. In one embodiment, the medication bins are filled by a robotic system, such as the ROBOT-Rx® system offered by McKesson Automation Inc. and described in U.S. Pat. Nos. 5,468,110, 5,593,267 and 5,880,443. Other examples are described in U.S. patent application Ser. Nos. 11/382,605, filed May 10, 2006, 11/611,956, filed Dec. 18, 2006 and 11/755,207, filed May 30, 2007, the contents of which are hereby incorporated herein by reference. In embodiments in which the medication bins are filled by a robotic system, the robotic system may include the delivery system for communicating with the medication bin. Although the medication bin may be configured to communicate with the delivery system via a wired connection, an optical connection or the like, the medication bin of one embodiment is configured to communicate wirelessly with the delivery system. Thus, the medication bin of one embodiment may include one or more antennas 18, a receiver 20, a transmitter 22 or the like (for example, the receiver and transmitter may be combined into a transceiver) for facilitating communication between the processor and the delivery system. In order to support operations of the medication bin, the medication bin may also include a battery 24 for providing power to the processor, the transmitter, the receiver and, in some embodiments, the display 14. It is noted, however, that the battery need not provide power to the display in instances in which the display is comprised of electronic ink.

Figure 3:
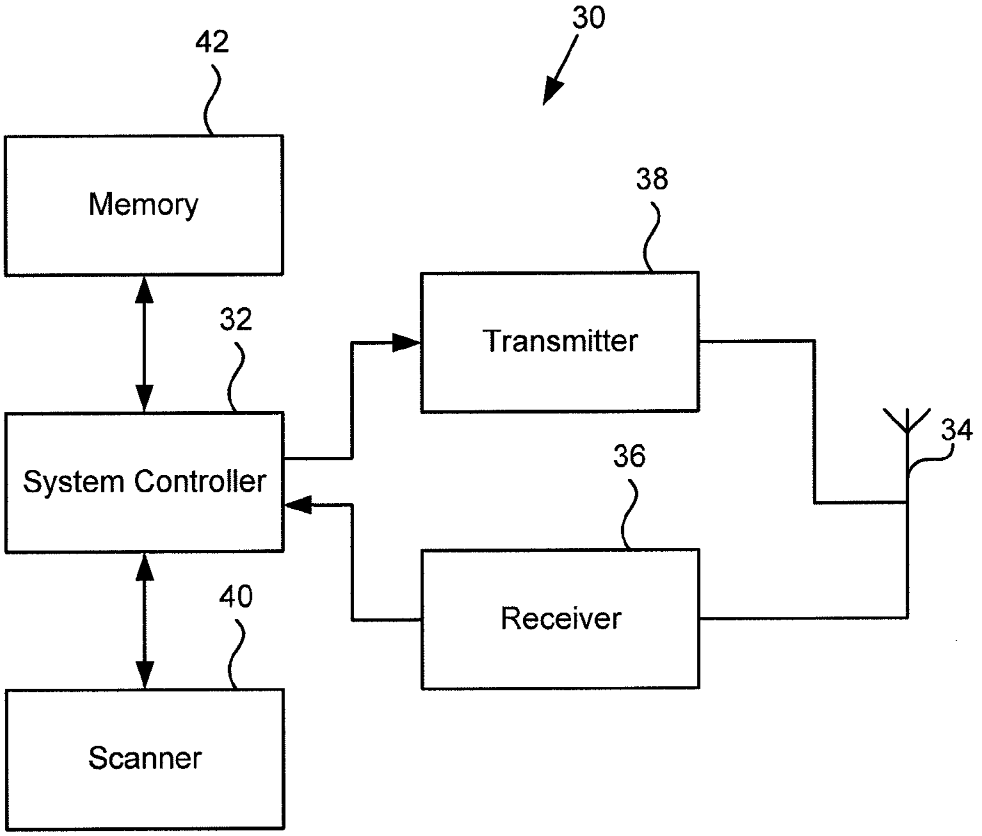
FIG. 3 is a block diagram of a delivery system for communicating with the medication bin in accordance with one embodiment of the present invention.

The delivery system 30 of one embodiment is depicted in FIG. 3. As shown, the delivery system includes a system controller 32, such as a processor, for controlling at least some operations of the delivery system. In embodiments in which the system controller is comprised of a processor, the processor may, in turn, be embodied as various processing means such as a processing element, a coprocessor, a controller or various other processing circuitry including integrated circuits such as, for example, an ASIC (application specific integrated circuit), an FPGA (field programmable gate array), a PLC (programmable logic controller), a hardware accelerator, or the like. The processor may be configured (e.g., via hardcoded instructions or via execution of software instructions) to perform or control the various functions described herein. In this regard, the medication bin may also include a memory device 42, such as volatile and/or non-volatile memory, for storing content, data or the like. For example, the memory device may be non-transitory memory capable of storing content transmitted from, and/or received by, the system controller. Also for example, the memory device may store software applications, instructions or the like for enabling the system controller to perform its various functions in accordance with embodiments of the present invention.

The delivery system 30 is also configured to communicate with the medication bin 10. As described above, the delivery system may be configured to communicate with the medication bin via wireline communications, optical communications or the like. However, the delivery system of the illustrated embodiment includes one or more antennas 34, a receiver 36, a transmitter 38 or the like (for example, the receiver and transmitter may be combined into a transceiver) for facilitating wireless communications with the medication bin. Additionally, the delivery system may include a power supply for providing power to the system controller, the transmitter, the receiver, the transceiver or the like.

Figure 4:
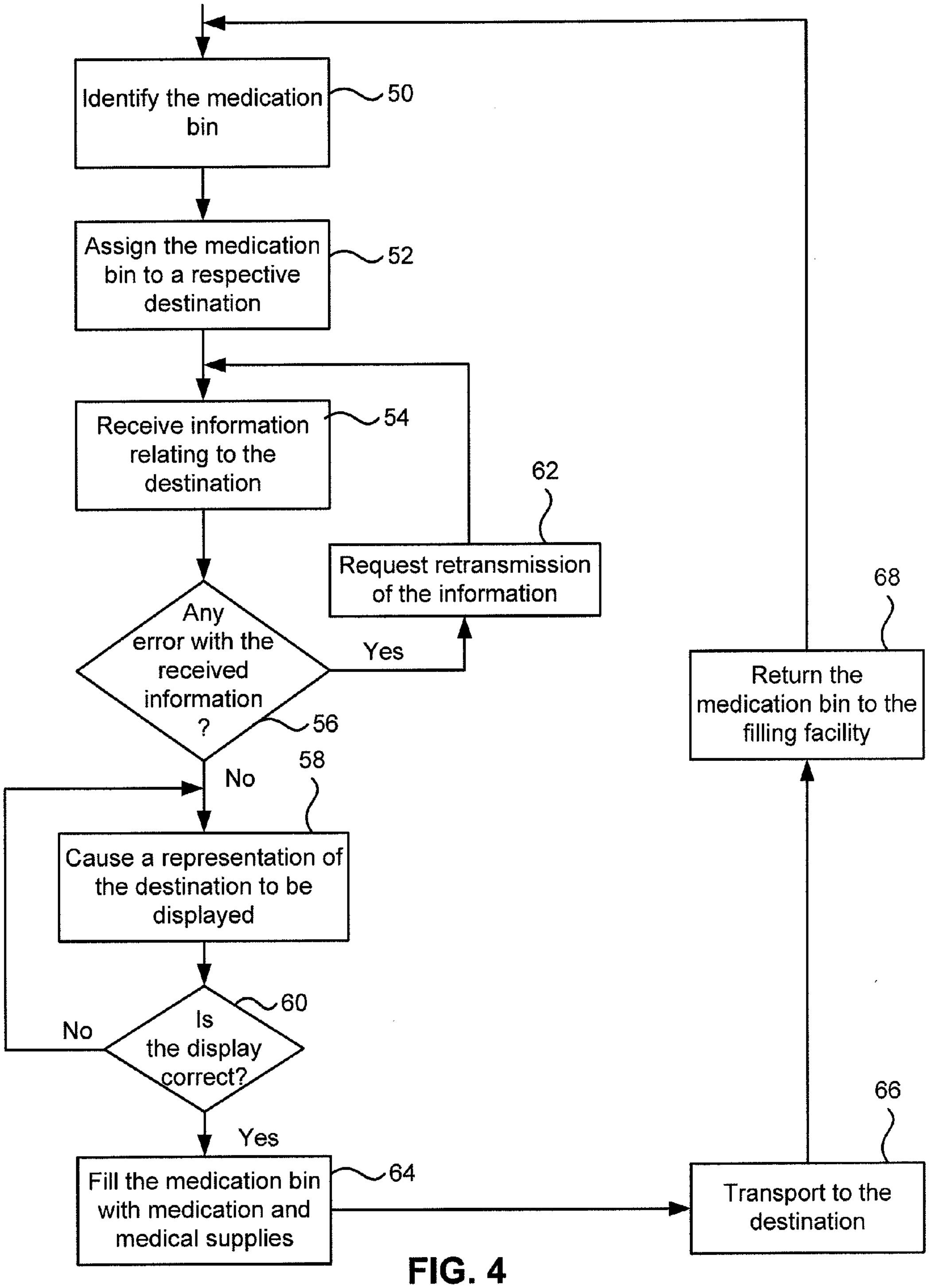
FIG. 4 is a flowchart illustrating operations performed in accordance with embodiments of the present invention.

In operation, the medication bin 10 of one embodiment may be initially identified as shown in operation 50 of FIG. 4. While the medication bin may be identified in various manners, the bin housing 12 of one embodiment carries indicia 26 that uniquely identifies a medication bin. For example, a bin housing may carry a bar code that uniquely identifies a medication bin. In this embodiment, the delivery system 30 may include a scanner 40 or other reader, such as a bar code scanner, such that the bar code carried by the bin housing may be scanned by the bar code scanner of the delivery system and the resulting indicia provided to the system controller 32 of the delivery system for uniquely identifying the medication bin. Once identified, the delivery system, such as the system controller, may assign the bin to a particular patient, medication cabinet or other destination. See operation 52 of FIG. 4. The delivery system, such as the system controller, may record the assignment of the medication bin to the respective patient, medication cabinet or other destination and store the assignment in the memory device 42.

Once the medication bin 10 has been assigned, the delivery system 30 may provide information regarding the destination to the medication bin for receipt by the medication bin. See operation 54 of FIG. 4. In the illustrated embodiment, for example, the medication bin may wirelessly receive the information relating to the destination with the antenna 18 and receiver 20 of the medication bin providing the information to the processor. Prior to driving the display 14 to present a representation of the information relating to the destination, the processor 16 may determine if the information that has been received was received without error, such as by performing an error detection routine. See operation 56. While the processor may employ various error detection routines, the processor of one embodiment is configured to determine a check sum for the information that was received relating to the destination and to then compare the check sum that has been determined with a check sum provided by the delivery system. In instances in which the processor determines that the information was received without error, the processor may then direct the electronic display to present a representation of the information relating to the destination. See operation 58. As described above, for example, the processor may be configured to direct the electronic display to present the name of the destination, such as the name of the patient or the name of the medication cabinet, the destination location, such as the location of the patient, e.g., room number, or the location of a medication cabinet, e.g., a unit and floor, or the like. In one embodiment, the processor may also be configured to conform that the electronic display has presented the correct information. See operation 60. For example, the processor may be configured to read back the information that is displayed by the electronic display and to confirm that the electronic display is actually presenting the correct information or, alternatively, to identify instances in which the electronic display is presenting incorrect information.

In the event that the processor 16 determines that an error has occurred, the processor may take appropriate action. For example, in instances in which the processor determines that the information that was received from the delivery system 30 was received errantly, such as a result of the check sum that is determined by the processor failing to match the check sum provided by the delivery system, the processor may cause an error message to be transmitted to the delivery system. In addition, the processor may request that the delivery system repeat the transmission of the information relating to the destination in an effort to receive the correct information. See operation 62 of FIG. 4. Additionally, if the processor determines in operation 60 that even though the correct information relating to the destination was received that the electronic display 14 is failing to display the desired information, the processor may again direct the electronic display to present the correct information. The processor may then again determine if the electronic display is presenting the correct information and, if not, may cause an error message to be transmitted to the delivery system, such as for presentation to an operator, such as a technician, a pharmacist or the like, that requests operator assistance with respect to the display provided by the medication bin 10.

Once it has been determined that no error has occurred in the receipt or display of the information relating to the destination of the medication bin 10, the medication bin may be filled with the medication or other medical supplies that are to be provided to the patient, the medication cabinet or the like to which the medication bin is assigned. See operation 64 of FIG. 4. In this regard, the delivery system 30 may include a record of the medication and other medical supplies to be provided to each of a plurality of different patients, medication cabinets or other destinations about the medical facility. As such, the association of the medication bin with the respective patient, medication cabinet or other destination in operation 52 allows the delivery system to identify the appropriate medication or other medical supplies and to then direct a technician, pharmacist, a robot or the like to fill the medication bin with the appropriate medication or other medical supplies.

Once the medication bin 10 has been filled with the medication and medical supplies and the electronic display 14 of the medication bin has been driven to present the desired information relating to the destination of the medication bin in a manner that is free of errors, the medication bin may be transported to the intended destination. See operation 66 of FIG. 4. In this regard, the reliability with which the medication bin is delivered to the desired destination may be increased as a result of the display of the destination upon the electronic display. Once the medication bin has been delivered to the intended destination, the medication bin may be unloaded with the medication and other medical supplies being removed from the medication bin and dispensed or otherwise stored as desired. Thereafter, the medication bin may be returned such as to a central pharmacy, central fill or the like. The medication bin may then be reused by repeating the process described above. See operation 68 of FIG. 4. In this regard, a medication bin then may be reassigned to another patient, medication cabinet or destination. In order to facilitate the repeated use of the medication bin, the medication bin may communicate with the delivery system to receive information regarding the next destination and may then cause the electronic display to change so as to present information relating to the new destination to which the refilled medication bin is to be transported. Thereafter, the medication bin may be refilled with the medication or other medical supplies that are appropriate for the next destination. The medication bin of embodiments of the present invention may therefore provide for the presentment of updated destination information upon the electronic display in an efficient and cost effective manner.

As described above, FIG. 4 is a flowchart of a method and, with respect to at least certain operations, a program product according to exemplary embodiments of the invention. It will be understood that a number of blocks of the flowchart, and combinations of those blocks in the flowchart, may be implemented by various means, such as hardware, firmware, processor, circuitry and/or other device associated with execution of software including one or more computer program instructions. For example, one or more of the procedures described above may be embodied by computer program instructions which may be stored in a memory device and executed by a processing device, such as a processor. In this regard, the computer program instructions which embody the procedures described in regards to blocks 50 and 52 may be stored by memory device 42 and executed by the system controller 32 of the delivery system 30 and the computer program instructions which embody the procedures described in regards to blocks 54-62 may be stored by a memory device and executed by the processor 16 of the medication bin 10. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block (s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Many modifications and other embodiments of the inventions set forth herein will come to mind to one skilled in the art to which these inventions pertain having the benefit of the teachings presented in the foregoing descriptions and the associated drawings. For example, the medication bin 10 may alternatively be filled with medication or medical supplies following the assignment of the medication bin to a destination, but prior to the provision of information regarding the destination to the medication bin. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A medication bin comprising:

a bin housing configured to carry medication or other medical supplies;

an electronic display carried by the bin housing; and a processor carried by the bin housing and configured to control the electronic display, wherein the processor is configured to receive information relating to a destination of the medication or other medical supplies to be carried by the medication bin and to direct the electronic display to present a representation of the destination;

wherein the processor is configured to receive the representation of the destination that is resented by the electronic display and to determine if the representation of the destination that is presented by the electronic display is accurate.

2. The medication bin according to claim 1 wherein the bin housing carries indicia uniquely identifying the medication bin.

3. The medication bin according to claim 1 further comprising an antenna and a receiver communicably connected to the antenna and configured to receive the information relating to the destination and to provide the information to the processor.

4. The medication bin according to claim 1 wherein the processor is configured to determine if the information relating to the destination was received without error.

5. The medication bin according to claim 1 further comprising an antenna and a transmitter communicably connected to the antenna and configured to transmit a signal indicative of any error relating to receipt and presentation of the information relating to the destination.

6. The medication bin according to claim 1 wherein the electronic display comprises electronic paper.

7. The medication bin according to claim 1 wherein the electronic display comprises a liquid crystal display.

8. The medication bin of claim 1, wherein in response to the processor determining that the representation of the destination that is presented by the electronic display is not accurate, the processor is configured to cause an error message to be transmitted.

9. A method for identifying a destination of a medication bin, the method comprising:

providing a bin housing configured to carry medication or other medical supplies;

receiving information relating to the destination of the medication or other medical supplies to be carried by the medication bin;

directing an electronic display carried by the bin housing to present a representation of the destination;

receiving, at a processor, the representation of the destination that is presented by the electronic display; and determining, at the processor, if the representation of the destination that is presented by the electronic display is accurate.

10. The method according to claim 9 further comprising:

following delivery of the medication bin to the destination, receiving information relating to another destination for medication or other medical supplies;

directing the electronic display to change and to present a representation of the another destination; and refilling the bin housing with the medication or other medical supplies for the another destination.

11. The method according to claim 9 wherein receiving the information comprises wirelessly receiving the information relating to the destination.

12. The method according to claim 9 further comprising determining if the information relating to the destination was received without error.

13. The method according to claim 9 further comprising transmitting a signal indicative of an error relating to receipt and presentation of the information relating to the destination.

14. The method of claim 9, further comprising:

causing an error message to be transmitted in response to determining, at the processor, that the representation of the destination that is presented by the electronic display is inaccurate.

15. A computer program product for identifying a destination of a medication bin that is to carry medication or other medical supplies, wherein the computer program product comprises at least one computer-readable storage medium having computer-executable program instructions stored therein, the computer-executable program instructions comprising:

program instructions configured to receive information relating to the destination of the medication or other medical supplies to be carried by the medication bin;

program instructions configured to direct an electronic display of the medication bin to present a representation of the destination program instructions configured to receive the representation of the destination that is presented by the electronic display, and program instructions to determine if the representation of the destination that is presented by the electronic display is accurate.

16. The computer program product according to claim 15 further comprising:

program instructions configured to receive information relating to another destination for medication or other medical supplies with which the medication bin is refilled following delivery of the medication bin to the destination; and program instructions configured to direct the electronic display to change and to present a representation of the another destination.

17. The computer program product according to claim 15 further comprising program instructions configured to determine if the information relating to the destination was received without error.

18. The computer program product according to claim 15 further comprising program instructions configured to cause a signal to be transmitted that is indicative of an error relating to receipt and presentation of the information relating to the destination.

19. The computer program product of claim 15, further comprising:

program instructions to cause an error message to be transmitted in response to determining that the representation of the destination that is presented by the electronic display is inaccurate.

* * * * *

UNITED STATES PATENT AND TRADEMARK OFFICE

CERTIFICATE OF CORRECTION

PATENT NO. : 8,660,687 B2
APPLICATION NO. : 12/750051
DATED : February 25, 2014
INVENTOR(S) : Leng It is certified that error appears in the above-identified patent and that said Letters Patent is hereby corrected as shown below:

In the claims:

Column 9,
Line 8, “resented by” should read --presented by--.

Signed and Sealed this
Twenty-seventh Day of May, 2014

Michelle K. Lee

Michelle K. Lee
*Deputy Director of the United States Patent and Trademark Office*